United States Patent
You et al.

(10) Patent No.: US 7,802,312 B2
(45) Date of Patent: Sep. 21, 2010

(54) METHOD OF RECORDING AND/OR REPRODUCING DATA UNDER CONTROL OF DOMAIN MANAGEMENT SYSTEM

(75) Inventors: Yong-kuk You, Seoul (KR); Yun-sang Kim, Suwon-si (KR); Yang-lim Choi, Seongnam-si (KR); Sung-hyu Han, Seoul (KR); Hee-chul Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1615 days.

(21) Appl. No.: 11/047,780

(22) Filed: Feb. 2, 2005

(65) Prior Publication Data

US 2005/0169118 A1 Aug. 4, 2005

(30) Foreign Application Priority Data

Feb. 2, 2004 (KR) .................. 10-2004-0006593

(51) Int. Cl.
    *G06F 7/04* (2006.01)
    *G06F 17/30* (2006.01)
    *H04N 7/16* (2006.01)
(52) U.S. Cl. .................... 726/31; 726/1; 726/4; 726/27
(58) Field of Classification Search .................. 726/1, 726/4, 26, 27, 28, 29, 31
See application file for complete search history.

(56) References Cited

U.S. PATENT DOCUMENTS

| | | | |
|---|---|---|---|
| 5,842,023 | A | 11/1998 | Tsumura |
| 6,339,423 | B1 * | 1/2002 | Sampson et al. ............ 715/854 |
| 2002/0046178 | A1 | 4/2002 | Morito et al. |
| 2002/0076205 | A1 | 6/2002 | Asada et al. |
| 2002/0114459 | A1 | 8/2002 | Belenko |
| 2003/0149974 | A1 | 8/2003 | Diehl |

(Continued)

FOREIGN PATENT DOCUMENTS

JP 04-086939 A 3/1992

(Continued)

OTHER PUBLICATIONS

Office Action dated Mar. 30, 2010 issued by the Japanese Patent Office in Japanese counterpart application 2006-550956.

*Primary Examiner*—David García Cervetti
(74) *Attorney, Agent, or Firm*—Sughrue Mion, PLLC

(57) ABSTRACT

Provided are a method of recording/reproducing data under control of a domain management system. The method includes extracting, from the write command, domain management information regarding the predetermined domain and contents, and copy control information specifying an extent of copying the contents within the predetermined domain; recording the extracted domain management information on the storage medium; generating a domain-bound flag that is used to determine whether the recording apparatus which records the contents on a storage medium is present in the predetermined domain, based on the extracted copy control information; and recording the domain-bound flag and the contents on the storage medium. Accordingly, it is possible to record contents, recording of which is limited within a predetermined domain, on a storage medium outside a slave under control of a domain management system, while preventing the contents from being reproduced within other domains.

20 Claims, 7 Drawing Sheets

U.S. PATENT DOCUMENTS

| | | |
|---|---|---|
| 2003/0217011 A1 | 11/2003 | Peinado et al. |
| 2003/0229632 A1* | 12/2003 | Harris ............................ 707/3 |
| 2004/0252840 A1 | 12/2004 | Moriyama et al. |
| 2005/0160185 A1* | 7/2005 | Matsuura et al. ................ 710/1 |
| 2005/0283532 A1* | 12/2005 | Kim et al. .................... 709/225 |
| 2006/0020784 A1* | 1/2006 | Jonker et al. ................. 713/157 |
| 2007/0143456 A1* | 6/2007 | Mashinsky ................... 709/223 |
| 2008/0313084 A1* | 12/2008 | Socolofsky ................... 705/52 |

FOREIGN PATENT DOCUMENTS

| | | |
|---|---|---|
| JP | 08-235781 A | 9/1996 |
| JP | 09-106613 A | 4/1997 |
| JP | 09-160899 A | 6/1997 |
| JP | 2001-292136 A | 10/2001 |
| JP | 2002-74827 A | 3/2002 |
| JP | 2002-132457 A | 5/2002 |
| JP | 2002-252828 A | 9/2002 |
| JP | 2003-069560 A | 3/2003 |
| JP | 2003-196161 A | 7/2003 |
| JP | 2003-274334 A | 9/2003 |
| JP | 2003-330560 A | 11/2003 |
| KR | 2000-0035427 A | 6/2000 |
| KR | 2001-51961 A | 6/2001 |
| WO | WO 00/21002 A | 4/2000 |
| WO | WO 01/95206 A | 12/2001 |
| WO | WO 02/086725 A | 10/2002 |
| WO | 03/021400 A2 | 3/2003 |
| WO | 03/098931 A1 | 11/2003 |

* cited by examiner

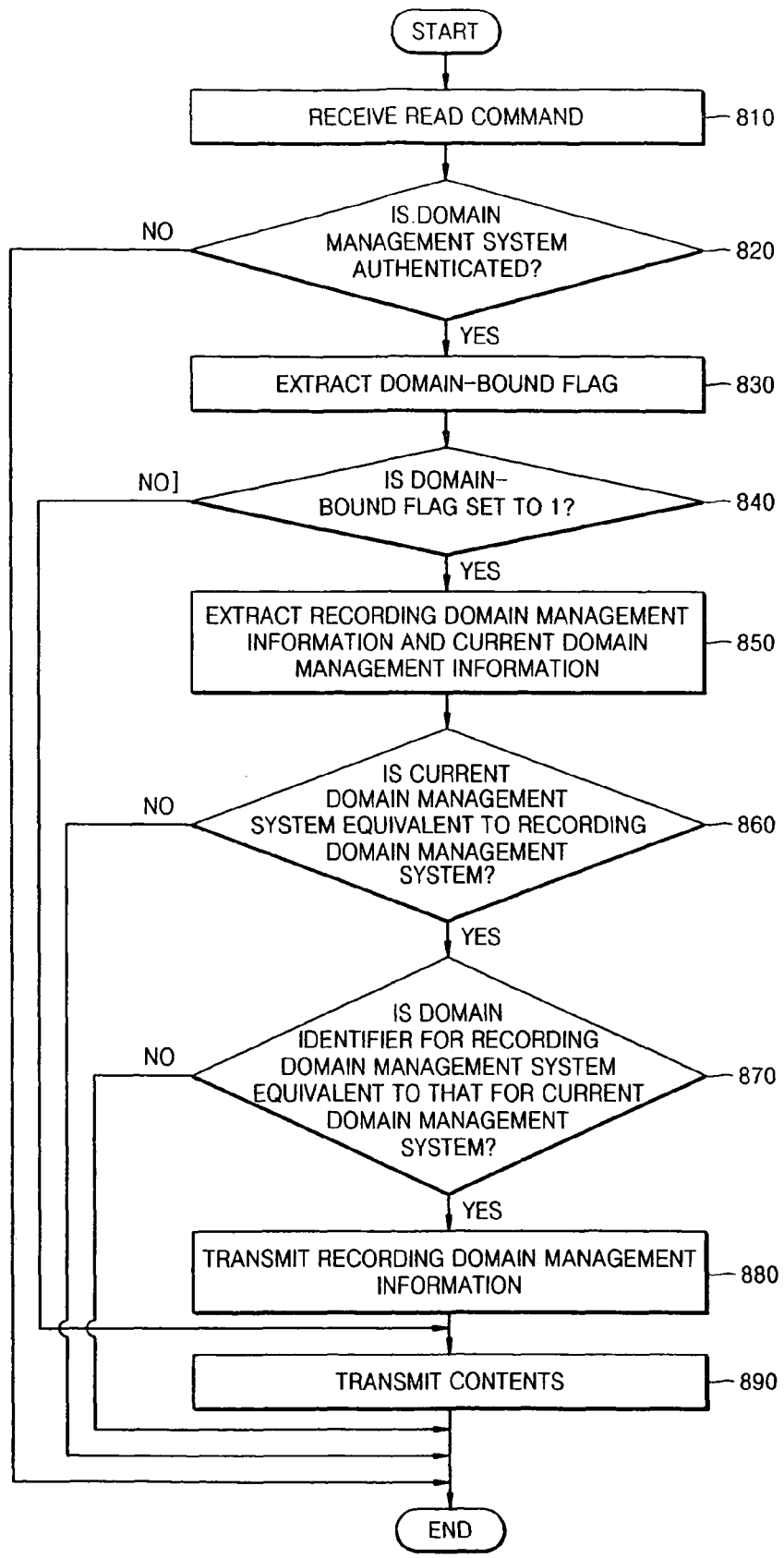

METHOD OF RECORDING AND/OR REPRODUCING DATA UNDER CONTROL OF DOMAIN MANAGEMENT SYSTEM

This application claims the priority of Korean Patent Application No. 10-2004-0006593 filed on Feb. 2, 2004 in the Korean Intellectual Property Office, the disclosure of which is incorporated herein in its entirety by reference.

BACKGROUND OF THE INVENTION

1. Field of the Invention

The present invention relates to a method of recording and reproducing data, and more particularly, to a method of recording and reproducing contents, recording and reproduction of which are restricted within a predetermined domain, in response to a write/read command input from a host with a domain management system.

2. Discussion of Related Art

Various types of multimedia reproducing apparatuses, such as a video tape recorder, a personal computer, an audio player, a television, and a personal digital assistant (PDA), have been used in households or offices. In general, contents such as video or music data reproduced by such apparatuses is copyrighted, and thus, its use is limited to authorized users. In general, the use of such contents is managed physically in units of individual residences including a household or an office, and a user who occupies an individual residence is charged a fee for using the contents.

In general, management of the use of contents in units of individual residences is controlled by a domain management system. The domain management system includes a home server that temporarily stores external contents, newly sets a right for accessing within a current domain, and manages rights for devices accessing the current domain. The domain management system also includes various types of reproducing apparatuses that are connected to the home server, given contents and a right to access the contents, and reproduce the contents.

The domain management system is referred to as application software installed in the home server and the reproducing apparatuses. The home server that provides rights to the contents to a reproducing apparatus and manages use of the contents, or application software installed in the home server that provides these features is referred to as a master. The reproducing apparatus or application software installed therein is referred to as a slave.

There are various types of domain management systems such as IBM's xCP and Thomson's SmartRight. These domain management systems have the following common characteristics. First, contents is provided by a master, and the master generates a domain key available only in a domain to which the master belongs and provides the domain key to its slave. Second, the master determines whether use of the contents provided in the domain is limited to authorized users, encrypts contents, use of which is limited, and sends the result of encrypting to its slave. Third, a content key for encrypting the contents is encrypted using the domain key and the result of encrypting is sent to the slave. Fourth, the master replaces a previous domain key with a new domain key, when a slave joins or leaves the domain or an illegally copied device is detected, and thus the right for the contents needs to be changed.

The slave temporarily stores the contents provided by the master in its memory and reproduces it later if necessary. However, the contents is preferably stored in an external storage medium, e.g., an optical disc, rather than in the memory of the slave, and is reproduced from the external storage medium if necessary.

However, when the existing domain key is changed, a conventional recording/reproducing apparatus subject to a slave cannot store contents input via the domain management system in an external storage medium and reproduce it later. In detail, the contents is encrypted using the content key, the content key is encrypted by the domain key; thus when the domain key is changed and provided to the slave when a new slave or an illegally copied slave accesses the domain or a previous slave is disconnected from the domain, the domain key used to encrypt the contents is no longer useful.

Since the external storage medium is not always connected to the slave, it is impossible to update information regarding a new domain key in the external storage medium in real time. Also, once the new domain key is provided to the slave, information regarding a previous domain key used when storing the contents in the external storage medium is deleted from the slave. In this case, the conventional recording/reproducing apparatus is not capable of reproducing the contents.

SUMMARY OF THE INVENTION

The present invention provides a method of recording contents on or reproducing contents from an external storage medium under control of a domain management system while observing a domain management rule that prevents contents from being illegally recorded and reproduced outside a predetermined domain.

According to an aspect of the present invention, there is provided a method of recording contents on a storage medium in response to a write command input from a domain management system that causes the contents to be used only within a predetermined domain, the method comprising extracting, from the write command, domain management information regarding the predetermined domain and contents, and copy control information specifying an extent of copying the contents within the predetermined domain; recording the extracted domain management information on the storage medium; generating a domain-bound flag that is used to determine whether the recording apparatus which records the contents on a storage medium is present in the predetermined domain, based on the extracted copy control information; and recording the domain-bound flag and the contents on the storage medium.

The copy control information specifies that the contents is domain-bound contents that is required to be recorded using only the recording apparatus that is present within the domain.

The domain management information comprises a domain identifier which identifies the domain.

The domain management information further comprises a content key for encrypting the contents and system information for identifying the domain management system.

According to another embodiment of the present invention, there is provided a method of reproducing contents from a storage medium under control of a domain management system that causes the contents to be used within a predetermined domain, the method comprising receiving a read command from the domain management system; reading a domain-bound flag that is used to determine whether reproduction of the contents is limited within the predetermined domain; when the domain-bound flag indicates reproduction of the contents only within the predetermined domain, receiving current domain management information regarding a current domain from the domain management system, and receiving recording domain management information regarding a recording domain in which recording of the contents is performed from the storage medium; determining whether the domain management system belongs to the predetermined domain based on the recording domain management information and the current domain management information; and transmitting the recording domain management information and the contents to the domain management system.

When the domain-bound flag indicates reproduction of the contents is not limited only within the predetermined domain, the contents is read from the storage medium and transmitted to the domain management system.

BRIEF DESCRIPTION OF THE DRAWINGS

The above and other aspects and advantages of the present invention will become more apparent by describing in detail exemplary embodiments thereof with reference to the attached drawings in which:

FIG. 8 is a flowchart illustrating a method of reproducing contents from a storage medium using a slave under control of a domain management system, according to an embodiment of the present invention.

DETAILED DESCRIPTION OF THE INVENTION

Hereinafter, exemplary embodiments of the present invention will be described in detail with reference to the accompanying drawings.

Figure 1:
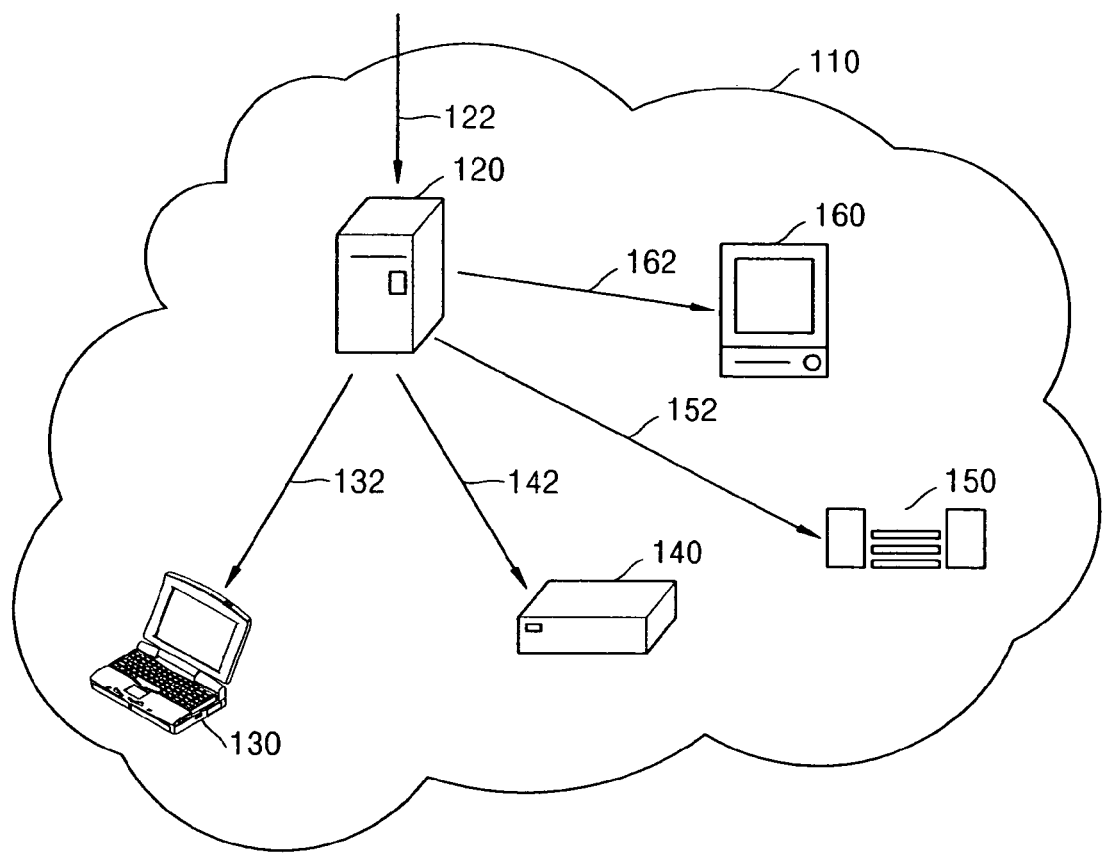
FIG. 1 is a schematic diagram of a domain management system according to an embodiment of the present invention.

FIG. 1 is a schematic diagram of a domain management system according to an embodiment of the present invention. Referring to FIG. 1, a master 120 receives external contents 122, encrypts the external contents using a content key Kt, and transmits the result of encrypting to its slaves 130, 140, 150, and 160. The master 120 also generates a domain key Kd available only in a current domain 110, encrypts the content key Kt using the domain key Kd, and sends the result of encrypting to the slaves 130, 140, 150, and 160.

Further, the master 120 individually generates copy control information (CCI) for all the contents and provides the contents and the CCI to the slaves 130, 140, 150, and 160. The CCI specifies whether the plural contents can be copied or describes an extent to which the plural contents can be copied. For instance, the CCI classifies the plural contents by copying states such as 'copy freely', 'private copy', 'copy once', and 'copy never'. Therefore, the respective slaves 130, 140, 150, and 160 can determine the extent of copying the respective contents based on the CCI.

Figure 2:
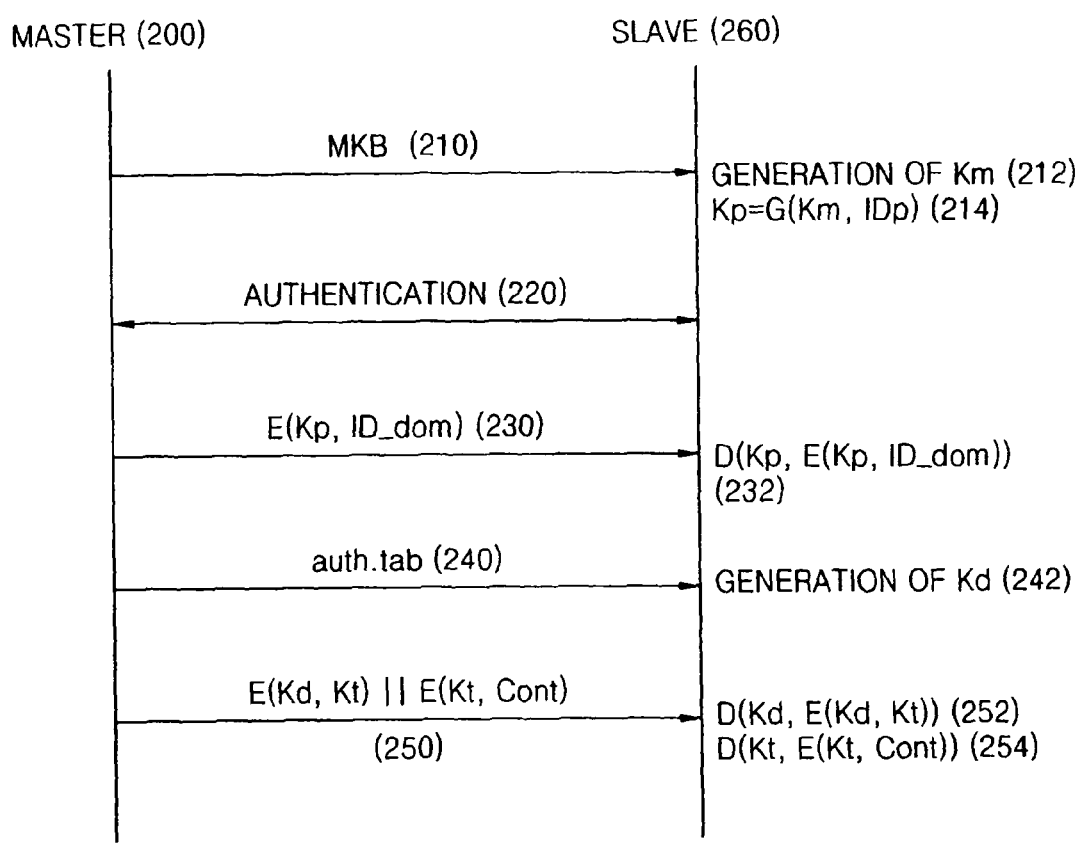
FIG. 2 illustrates transmission of contents and various types of keys between a master and a slave under control of a domain management system, according to an embodiment of the present invention.

FIG. 2 illustrates transmission of contents and various types of keys between a master 200 and a slave 260 under control of a domain management system (not shown), according to an embodiment of the present invention. Referring to FIG. 2, the master 200 sends a media key block MKB to the slave 260 (step 210).

Next, the slave 260 generates a media key Km using the received media key block MKB (step 212). The media key block MKB is used to detect an illegally copied apparatus. The slave 260 can generate the media key Km by combining its device key set Set_K_dev and the received media key block MKB. If the illegally copied apparatus is detected, a new media key block MKB' is transmitted to the slave 260, and thus, the illegally copied apparatus is not allowed to generate the media key Km.

Thereafter, the slave 260 generates a slave private key Kp using the media key Km and a slave identifier IDp (step 214).

Next, the slave 260 sends the slave identifier IDp and the slave private key Kp to the master 200, and the master 200 authenticates the slave 260 by determining whether the slave private key Kp is legally generated, using the media key Km extracted from its media key block MKB and the slave identifier IDp (step 220).

After the authentication, the master 200 encrypts a domain identifier ID_dom of the domain to which it belongs using the slave private key Kp and sends the result of encrypting, i.e., encrypted domain identifier E(Kp,ID_dom), to the slave 260 (step 230).

Next, the slave 260 decrypts the encrypted domain identifier E(Kp,ID_dom) using the slave private key Kp to obtain a decrypted domain identifier (step 232).

Next, the master 200 sends an authentication table auth.tab listing the slave identifier IDp of the authenticated slave 260 to the slave 260 (step 240), and the slave 260 generates a domain key Kd using the authentication table auth.tab (step 242). In general, the domain key Kd is generated by the master 200 using the domain identifier ID_dom but the slave 260 can also generate it using the domain identifier ID_dom. A change in the authentication table auth.tab results in a change in the domain key Kd.

Next, the master 200 transmits contents E(Kt,Cont) encrypted using a content key Kt and a content key E(Kd,Kt) encrypted using the domain key Kd to the slave 260 (step 250).

Next, the slave 260 generates the content key Kt by decrypting the content key E(Kd,Kt) encrypted using the domain key Kd in step 242 (step 252), and then, obtains contents Cont by decrypting the contents E(Kt,Cont) that is encrypted using the content key Kt and reproduces the content Cont (step 254).

As described above, the domain key Kd is used to encrypt the content key Kt and the content key Kt is used to encrypt the E(Kt, Cont). The domain key Kd is generated using the domain identifier ID_dom and the authentication table auth.tab, and therefore, it is changed when the domain identifier ID_dom is changed, connection of an illegally copied apparatus to the domain is detected, or the authentication table auth.tab is changed.

When the domain key Kd is replaced by a new domain key Kd', the master 200 encrypts the content key Kt using the new domain key Kd', sends the result of encrypting to the slave 260, and provides a new authentication table auth.tab' to the slave 260.

A method of recording domain-bound contents, use of which is limited within a predetermined domain, on a storage medium 310 using a slave, such as a drive 320, which is present within the predetermined domain will now be described with reference to FIGS. 3 through 6.

In this disclosure, a domain management system will be considered as a term that is equivalent to application software installed in a host to send a write/read command to a recording/reproducing apparatus that includes a drive. Accordingly, exchange of data between the recording/reproducing apparatus and the domain management system is made in response to the write/read command input from the host and according to the response of the drive to the write/read command.

Also, in this disclosure, the recording/reproducing apparatus denotes hardware/software including an algorithm that enables data to be recorded on or reproduced from a storage medium in response to the write/read command input from the host. Thus, a structure of the recording/reproducing apparatus will be schematically illustrated in the drawings and described.

Figure 3:
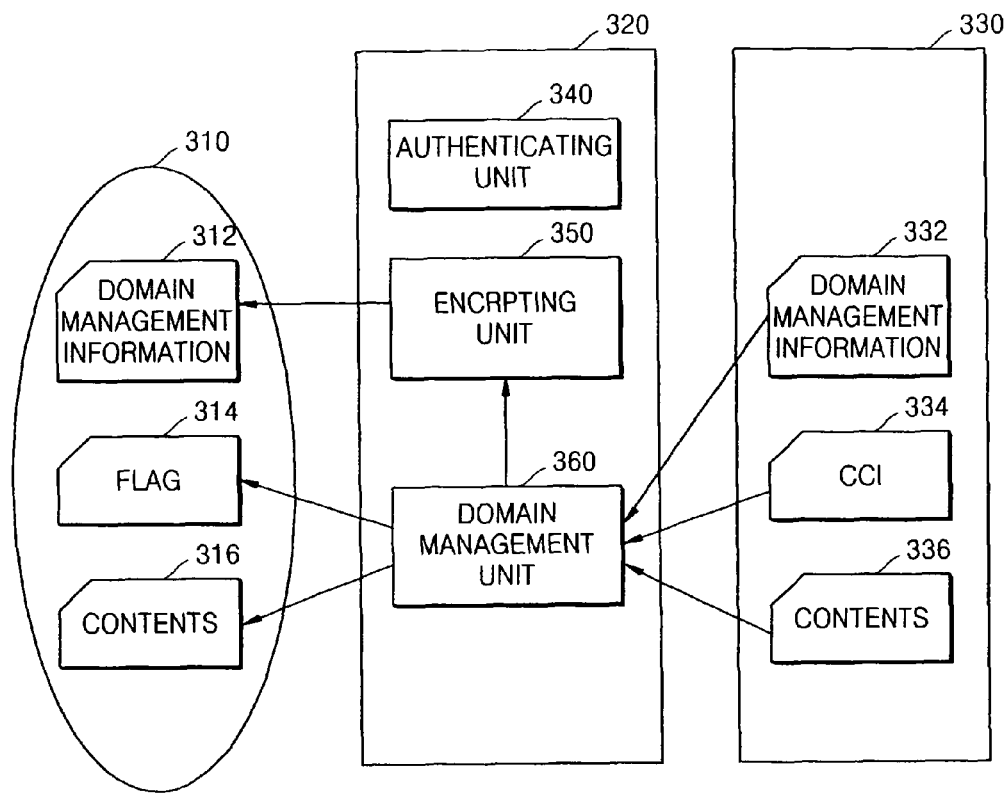
FIG. 3 is a diagram of a recording apparatus for storing contents in a slave, according to an embodiment of the present invention.

FIG. 3 is a diagram of a recording apparatus, such as a drive 320, that stores contents 336 in a storage medium 310, according to an embodiment of the present invention. The drive 320 includes an authenticating unit 340, an encrypting unit 350, and a domain management unit 360. A domain management system 330 is a type of application software installed in a host (not shown) that transmits a write/read command to the drive 320. For instance, the domain management system 330 may be IBM's xCP or Thomson's SmartRight.

The write command from the host contains domain management information 332, CCI 334, and contents 336 which are generated by the domain management system 330. The domain management unit 360 of the drive 320 extracts the domain management information 332, the CCI 334, and the contents 336 from the write command.

Figure 4:
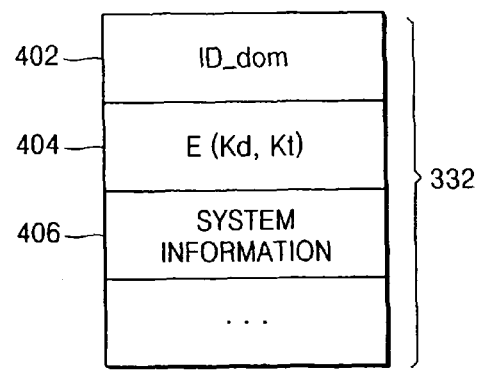
FIG. 4 illustrates a data structure of domain management information.

FIG. 4 illustrates a data structure of the domain management information 332. The domain management information 332 contains a domain identifier ID_dom 402, an encrypted content key E(Kd, Kt) 404, and system information 406 which includes an identifier of the domain management system 330, the domain management information 332 being transmitted from the master 200. The domain management information 332 is generated by the domain management system 330 and contained in a write command sent to the drive 320 via the host.

Returning back to FIG. 3, the authenticating unit 340 performs mutual authentication between the drive 320 and the domain management system 330 that is application software.

The domain management unit 360 extracts the domain management information 332 and the CCI 334 from the write command received from the host. Next, the domain management unit 360 determines whether the extracted CCI 334 indicates that the contents 336 is in a 'copy never' state. If the contents 336 is in the 'copy never' state, it is not recorded on the storage medium 310 since use of the contents 336 is not allowed to the slave 260.

If the contents 336 is not in the 'copy never' state, the domain management unit 360 determines whether the contents 336 is domain-bound information, that is, whether use of the contents 336 is limited to a predetermined domain corresponding to a predetermined domain identifier.

If the contents 336 is not domain-bound information, it is recorded on the storage medium 310 without taking other steps. That is, when reproduction of the contents 336 is not restricted only within the predetermined domain, a content key and other related information are not required to be stored in the storage medium 310.

If the contents 336 is domain-bound information, the domain management unit 360 performs the following processes. First, the domain management unit 360 generates a domain-bound flag 314 and stores it in a predetermined section of the storage medium 310. The domain-bound flag 314 is linked to contents 316, and informs the drive 320 that the contents 316 can be reproduced only within a predetermined domain.

Second, the domain management unit 360 stores the domain management information 332 as domain management information 312 in a predetermined section of the storage medium 310, since the domain management information 332 contains information, such as a domain identifier, which is required to reproduce the contents 316. The domain management information 332 is preferably, but not necessarily, encrypted using disc information or drive information stored in the drive 320. A method of generating an encrypting key in a drive is well known to those skilled in the art, and thus, a description thereof is omitted here.

Thirdly, the drive 320 stores the contents 336 in the storage medium 310 as contents 316 without performing an additional encrypting process, since the contents 336 has already been encrypted by the domain management system 330 using a content key.

Figure 5:
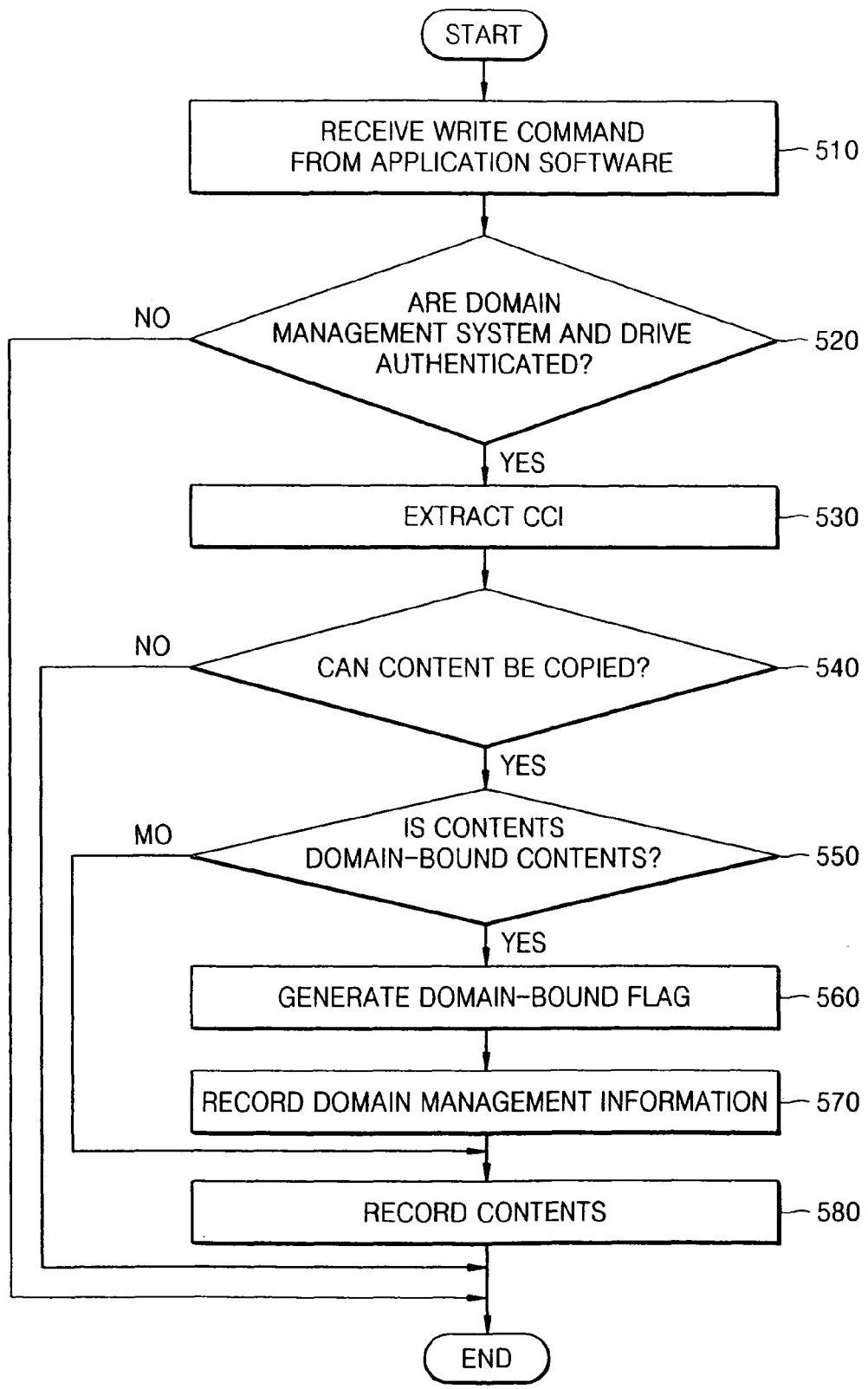
FIG. 5 is a flowchart illustrating a method of storing contents in a storage medium using a slave under control of a domain management system, according to an embodiment of the present invention.

FIG. 5 is a flowchart illustrating a method of storing the contents 336 in the storage medium 310 as contents 316 under control of the domain management system 330, according to an embodiment of the present invention. Referring to FIG. 5, a write command generated by application software, which is the domain management system 330, is transmitted to the drive 320 via a host (not shown) (step 510). The domain management system 330 is almost the same as IBM's xCP and Thomson's SmartRight, except that domain-bound CCI is additionally defined therein.

In receipt of the write command, the authenticating unit 340 performs mutual authentication between the domain management system 330, which generates the write command, and the drive 320 (step 520). The mutual authentication enables an illegally copied apparatus to be sorted out based on a certified revocation list (CRL). Authentication will be later described with reference to FIG. 6.

Next, after the mutual authentication, the domain management unit 360 extracts the CCI 334 from the write command (step 530).

Next, the domain management unit 360 determines whether the contents 336 can be copied to the storage medium 310 based on the CCI 334 (step 540). If the CCI 334 indicates that the contents 336 is in the 'copy never' state, the drive 320 ignores the write command and discontinues write operation.

If the CCI 334 is not in the 'copy never' state, the domain management unit 360 determines whether reproduction of the contents 336 is limited only within a predetermined domain based on the CCI 334 (step 550).

If the contents 336 is domain-bound information, the domain management unit 360 generates the domain-bound flag 314 and stores it when storing the contents 336 in the storage medium 310 (step 560) as contents 316. The domain-bound flag 314 is linked to the contents 336 via a header or a pointer.

Also, the domain management unit 360 extracts the domain management information 332 from the write command input from the host and records it in a predetermined section of the storage medium 310 (step 570). The predetermined section is preferably a protected section of the storage medium 310. Reproduction of data from the protected section further requires a process of determining whether a user is given authorization access to the protected section.

Also, the domain management unit 360 records the contents 336 on the storage medium 310 as contents 316.

If the contents 336 is not domain-bound contents, only the contents 336 is recorded on the storage medium 310 (as contents 316) without recording the domain-bound flag 314 and the domain management information 332 (step 580).

Figure 6:
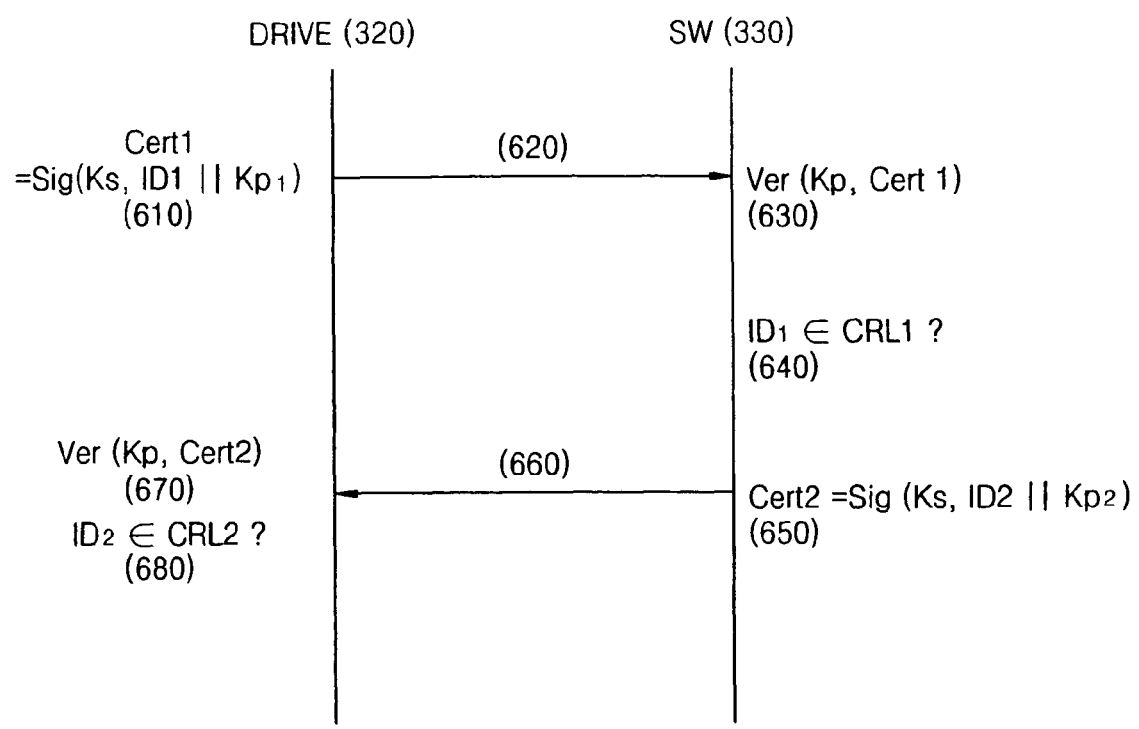
FIG. 6 illustrates mutual authentication between a drive and application software, according to an embodiment of the present invention.

FIG. 6 illustrates mutual authentication between the drive 320 and the application software 330, according to an embodiment of the present invention. Referring to FIG. 6, the application software 330 authenticates the drive 320 in steps 610 through 640.

More specifically, the drive 320 is given a certificate Cert1 certifying that a drive identifier ID1 and a drive public key Kp1 are authenticated using a private key Ks of a third authentication agency (step 610), and sends the certificate Cert1 to the application software 330 (step 620).

Next, the application software 330 receives the certificate Cert1 and verifies it using a public key Kp of the third authentication agency (step 630). If the certificate Cert1 is verified, the drive identifier ID1 and the drive public key Kp1 are determined to be authentic drive identifier and public key of the drive 320 that sends the certificate Cert1.

Next, the application software 330 checks whether the drive identifier ID1 is listed in a CRL CRL1 and determines whether the drive 320 is illegally copied based on the result of checking (step 640).

In steps 650 through 680, the drive 320 authenticates the application software 330. Steps 650 through 680 are similar to steps 610 through 640.

First, the application software 330 is given a certificate Cert2 certifying that its software identifier ID2 and software public key Kp2 are authenticated using the private key Ks of the third authentication agency (step 650), and sends the certification Cert2 to the drive 320 (step 660).

The drive 320 receives the certificate Cert2 and verifies it using public key Kp of the third authentication agency (step 670). If the certificate Cert2 is verified, the software identifier ID2 and the software public key Kp2 are determined authentic software identifier and public key of the application software 330.

Next, the drive 320 checks whether the software identifier ID2 is listed in a CRL CRL2 and determines whether the application software 330 is illegally copied based on the result of checking (step 680).

A method of reproducing domain-bound contents from a storage medium 310 using a slave will now be described with reference to FIGS. 7 and 8.

Figure 7:
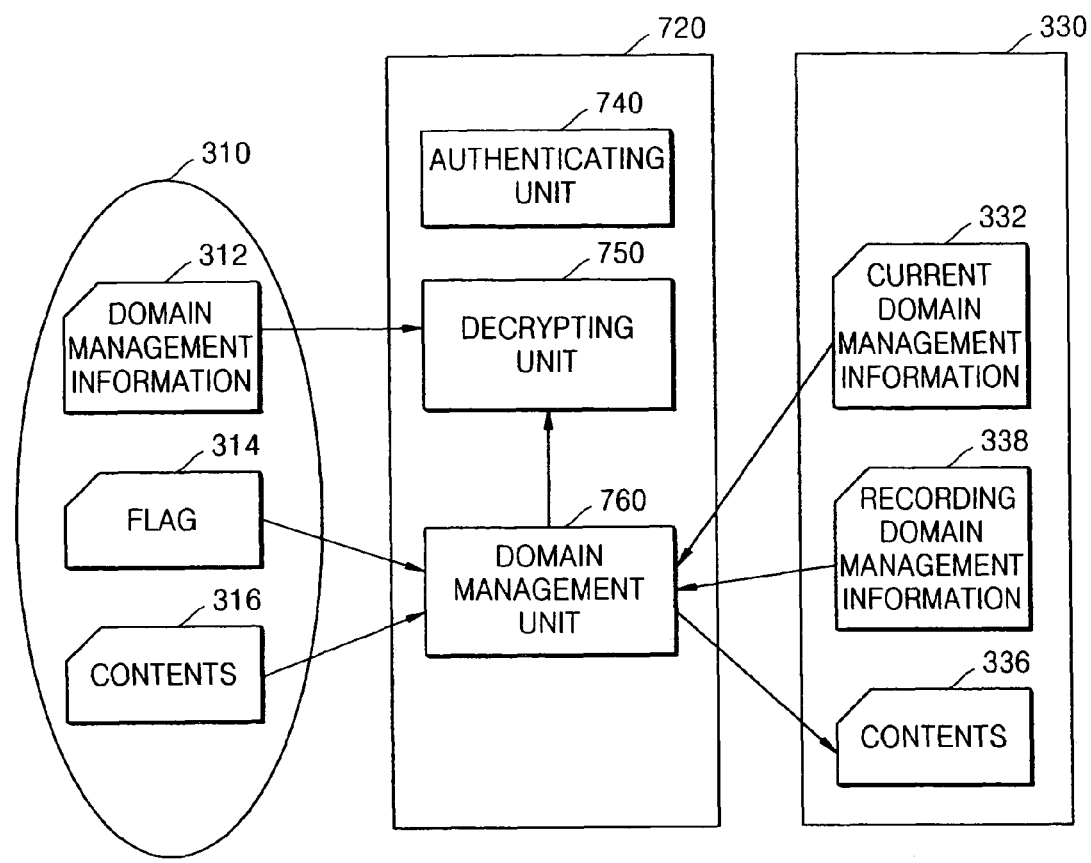
FIG. 7 illustrates a relationship among a storage medium, a reproducing apparatus, and a domain management system, according to an embodiment of the present invention.

FIG. 7 illustrates a relationship among the storage medium 310, a slave such as a reproducing apparatus 720, and the domain management system 330, according to an embodiment of the present invention. Referring to FIG. 7, the storage medium 310 stores the contents 316, and recording domain management information 312 and a domain-bound flag 314 which are recorded when storing the contents 316. As shown in FIG. 4, the recording domain management information 312 contains information such as a domain identifier, an encrypted content key, and system information. The domain identifier and the system information are made when the contents 316 is recorded on the storage medium 310.

The reproducing apparatus 720 includes a domain management unit 760 that determines whether reproduction of the contents 316 under control of the domain management system 330 is allowed.

When the reproducing apparatus 720 receives a read command from the domain management system 330, the domain management unit 760 reads the contents 316 indicated in the read command, and the domain-bound flag 314. The contents 316 and the domain-bound flag 314 are linked to each other via a header or a pointer.

Next, the domain management unit 760 checks the domain-bound flag 314 to determine whether the contents 316 is domain-bound contents.

In an exemplary embodiment of the present invention, the domain-bound flag 314 is set to 1 when the contents 316 is not domain-bound contents.

If the domain-bound flag 314 is 1, the domain management unit 760 reads the recording domain management information 312 from the storage medium 310 and obtains current domain management information 332 from the domain management system 330.

The current domain management information 332 specifies a current domain to which the domain management system 330 belongs, and the domain management system 330 is installed in the host to send the read command to the reproducing apparatus 720. As shown in FIG. 4, the current domain management information 332 contains a domain identifier, an encrypted content key, and system information.

The recording domain management information 312, which is recorded when the contents 316 is recorded on the storage medium 310, specifies a recording domain to which the domain management system 330 belongs, and the domain management system 330 is installed in a host (not shown) to send a write command to the reproducing apparatus 720.

Next, the domain management unit 760 determines whether the current domain is equivalent to the recording domain by comparing the current domain management information 332 with the recording domain management information 312.

If the current domain and the recording domain are the same, the reproducing apparatus 720 sends the recording domain management information 312 and the contents 316 to the domain management system 330.

The reproducing apparatus 720 may further include a decrypting unit 750 that decrypts the recording domain management information 312 that is encrypted. As shown in FIG. 3, domain management information may be encrypted and recorded when recording contents for security. In this case, a decrypting process is further required for a read operation.

Also, the reproducing apparatus 720 may further include an authenticating unit 740. The authenticating unit 740 determines whether the reproducing apparatus 720 is illegally copied. A method of authenticating the domain management system 330 using the authenticating unit 740 is similar to the operation of the authenticating unit 340 of FIG. 6.

FIG. 8 is a flowchart illustrating a method of reproducing the contents 316 from the storage medium 310 under control of the domain management system 330, according to an embodiment of the present invention. Referring to FIG. 8, upon receiving a read command from the domain management system 330 (step 810), the authenticating unit 740 authenticates the domain management system 330 to determine whether it is illegally copied (step 820). A method of authenticating the domain management system 330 is similar to the method of FIG. 6.

If the domain management system 330 is verified, the domain management unit 760 reads the contents 316 indicated in the read command, and the domain-bound flag 314 linked to the contents 316 from the storage medium 310 (step 830).

Next, the domain management unit 760 checks the domain-bound flag 314 to determine whether the contents 316 is domain-bound contents (step 840). If the domain-bound flag 312 is 1 which means the contents 316 is domain-bound, steps 850 through 880 are performed.

The domain management unit 760 reads the recording domain management information 312 from the storage medium 310 and receives the current domain management information 332 from the domain management system 330 (step 850).

Next, the domain management unit 760 compares information regarding a recording domain management system contained in the recording domain management information 312 with information regarding a current domain management system contained in the current domain management information 332, and determines whether they are equivalent to each other (step 860).

According to an embodiment of the present invention, information regarding a recording (or current) domain management system contains a content file extension, a domain management system identifier, and system version information.

If the current domain management system is equivalent to the recording domain management system, the domain management unit 760 checks whether a domain identifier in the information regarding the recording domain management system is equivalent to that in the information regarding the current domain management system and determine whether reproduction of the contents 316 is allowed in the current domain based on the result of checking (step 870).

If the two domain identifiers are the same, the domain management unit 760 transmits recording domain management information 312 and the contents 316 to the domain management system 330 (steps 880 and 890).

If it is determined in step 840 that the domain-bound flag 312 is not 1, the domain management unit 760 sends the contents 316, which indicated in the read command, to the domain management system 330 and discontinues reproduction of the contents 316 (step 890).

When it is determined in step 860 that the current domain management system is not equivalent to the recording domain management system or it is determined in step 870 that the two domain identifiers are not the same, the domain management unit 760 discontinues reproduction of the contents 316 without sending the contents 316 to the domain management system 330.

As described above, in a method of recording and/or reproducing data according to the present invention, it is possible to determine whether recording or reproduction of contents is limited within a predetermined domain and allow the contents to be recorded on or reproduced from a storage medium outside a slave based on the result of determination under control of a domain management system.

The present invention is applicable to an apparatus that records/reproduces data under control of the domain management system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of recording contents on a storage medium in a computing device comprising a processor having computing device-executable instructions, the contents being recorded in response to a write command input from a domain management system that causes the contents to be used only within a predetermined domain, the method comprising:
   extracting, from the write command, domain management information regarding the predetermined domain and the contents, and copy control information specifying an extent of copying the contents within the predetermined domain;
   recording, using the processor, the extracted domain management information on the storage medium;
   generating a domain-bound flag that is used to determine whether the recording apparatus which records the contents on the storage medium is present in the predetermined domain, based on the extracted copy control information; and
   recording the domain-bound flag and the contents on the storage medium.

2. The method of claim 1, wherein the copy control information specifies that the contents is domain-bound contents that is required to be recorded using only the recording apparatus that is present within the domain.

3. The method of claim 2, wherein the copy control information classifies an extent of copying the contents by a copying state including at least one of copy never, copy freely, private copy, copy once, domain-bound copy.

4. The method of claim 2, wherein the domain management information further comprises a content key for encrypting the contents and system information for identifying the domain management system.

5. The method of claim 4, wherein the content key is encrypted using a domain key that is available only to a user authorized to access to the domain.

6. The method of claim 5, wherein the system information comprises one of an identifier that identifies the domain management system and domain management system version information, or both the identifier and the domain management system version information.

7. The method of claim 5, wherein encrypting of the content key uses an encrypting key generated, using drive information regarding the recording apparatus that records the contents and disc information regarding the storage medium.

8. The method of claim 1, wherein the domain management information comprises a domain identifier which identifies the domain.

9. The method of claim 1, wherein recording the domain management information comprises encrypting the domain management information.

10. The method of claim 1, further comprising authenticating the domain management system.

11. The method of claim 10, wherein the domain management system is authenticated using a predetermined certified revocation list.

12. The method of claim 11, wherein authenticating the domain management system comprises:
   receiving a certificate certifying that a software identifier and a software public key of the domain management system are authenticated using a private key of a third authentication agency;
   verifying the certificate using a public key of the third authentication agency; and
   determining whether the software identifier is listed in the certified revocation list.

13. A method of reproducing contents in a computing device comprising a processor having computing device-executable instructions, the contents being reproduced from a storage medium under control of a domain management system that causes the contents to be used within a predetermined domain, the method comprising:

receiving a read command from the domain management system;

reading a domain-bound flag that is used to determine whether reproduction of the contents is limited within the predetermined domain;

when the domain-bound flag indicates reproduction of the contents only within the predetermined domain, receiving current domain management information regarding a current domain from the domain management system, and receiving recording domain management information regarding a recording domain in which recording of the contents is performed from the storage medium;

determining, using the processor, whether the domain management system belongs to the predetermined domain based on the recording domain management information and the current domain management information; and transmitting the recording domain management information and the contents to the domain management system.

14. The method of claim 13, wherein when the domain-bound flag indicates reproduction of the contents is not limited only within the predetermined domain, the contents is read from the storage medium and transmitted to the domain management system.

15. The method of claim 13, wherein the current domain management information comprises a domain identifier that identifies the current domain, and the recording domain management information comprises a domain identifier enabling identification of the recording domain.

16. The method of claim 15, wherein both the current domain management information and the recording domain management information comprise a content key for encrypting the contents and system information enabling identification of the domain management information.

17. The method of claim 16, wherein the content key is encrypted using a domain key that is available only to a user authorized to access to the predetermined domain.

18. The method of claim 16, wherein the system information comprises one of a system identifier for identifying the domain management system and domain management system version information, or both the system identifier enabling and domain management system version information.

19. The method of claim 18, wherein determining whether the domain management system belongs to the predetermined domain comprises determining whether the current domain management system is equivalent to the recording domain management system based on the system information.

20. The method of claim 18, wherein determining whether the domain management system belongs to the predetermined domain further comprises determining whether the current domain management system is equivalent to the recording domain management system based on the domain identifier.

* * * * *